United States Patent
Yamamoto

(10) Patent No.: US 6,638,467 B1
(45) Date of Patent: Oct. 28, 2003

(54) MOLDING EJECTOR PLATE STRUCTURE AND METHOD OF EJECTING MOLDED ARTICLES FROM MOLD CAVITY THEREWITH

(75) Inventor: Hiroaki Yamamoto, Brookville, OH (US)

(73) Assignee: Green Tokai Co., Ltd., Brookville, OH (US)

( * ) Notice: Subject to any disclaimer, the term of this patent is extended or adjusted under 35 U.S.C. 154(b) by 0 days.

(21) Appl. No.: 10/049,883

(22) PCT Filed: Aug. 3, 2000

(86) PCT No.: PCT/US00/40555

§ 371 (c)(1),
(2), (4) Date: Feb. 12, 2002

(87) PCT Pub. No.: WO01/12410

PCT Pub. Date: Feb. 22, 2001

Related U.S. Application Data

(60) Provisional application No. 60/149,127, filed on Aug. 16, 1999.

(51) Int. Cl.[7] .................. B29C 45/14; B29C 45/40; B29C 33/44
(52) U.S. Cl. .............. 264/263; 264/259; 264/266; 264/334; 425/125; 425/129.1; 425/556; 425/438; 425/444
(58) Field of Search .................. 264/259, 263, 264/266, 275, 278, 334, 336; 425/112, 125, 129.1, 556, 577, 436 R, 438, 441, 443, 444

(56) References Cited

U.S. PATENT DOCUMENTS

| | | | |
|---|---|---|---|
| 3,737,268 A | 6/1973 | Ryder | |
| 3,844,703 A | 10/1974 | Hütter | |
| 3,971,841 A | * 7/1976 | Rubinstein | 264/275 |
| 4,327,051 A | * 4/1982 | Edmondson | 264/318 |
| 4,360,329 A | * 11/1982 | Hatakeyama | 425/112 |
| 4,854,849 A | * 8/1989 | Sudo | 425/556 |
| 5,000,903 A | 3/1991 | Matzinger et al. | |
| 5,017,123 A | 5/1991 | Sloane | |
| 5,122,051 A | 6/1992 | Joyner | |
| 5,183,615 A | 2/1993 | Zushi | |
| 5,252,057 A | 10/1993 | Landstorfer | |
| 5,650,115 A | 7/1997 | Proos | |
| 5,773,048 A | * 6/1998 | Ramsey | 425/556 |
| 5,922,368 A | * 7/1999 | Murphy | 425/552 |
| 6,017,481 A | * 1/2000 | Winget | 264/255 |
| 6,136,249 A | 10/2000 | Takeuchi et al. | |
| 6,143,227 A | * 11/2000 | Heiden et al. | 264/267 |

* cited by examiner

Primary Examiner—Angela Ortiz
(74) Attorney, Agent, or Firm—Wegman, Hessler & Vanderburg

(57) ABSTRACT

Improved lifter (32) for injection molding apparatus and method of use thereof are disclosed. To inhibit the unsightly blemishes that may be formed in plastic parts wherein the lifter (32) comprises a leading edge (44) that is perpendicularly oriented relative to the longitudinal axis of the molded part, a lifter plate is provided wherein the leading edge (44) thereof is obliquely angled relative to the longitudinal axis of the molded part.

13 Claims, 5 Drawing Sheets

MOLDING EJECTOR PLATE STRUCTURE AND METHOD OF EJECTING MOLDED ARTICLES FROM MOLD CAVITY THEREWITH

CROSS-REFERENCE TO RELATED APPLICATIONS

This is an application filed under 35 USC §371 of International Application PCT/US00/40555 filed Aug. 3, 2000. Priority benefit of U.S. Provisional Patent Application No. 60/149,127 filed Aug. 16, 1999 is hereby claimed.

FIELD OF THE INVENTION

The present invention relates to an improved lifter structure and method of using that structure in the ejection of molded articles from an injection molding machine and the like.

BACKGROUND OF THE INVENTION

It has become increasingly popular to manufacture automobile and truck trim and body pans such as fenders, bumpers. rocker panels, body panels, doors, filler panels, wheel covers, dash boards, arm rests, chin spoiler and other parts via injection molding techniques. Moreover, to minimize the emission of VOC compounds and to improve upon the aesthetic appearance of many parts, plastic parts having a paint film laminate covering the show surface have been successfully utilized in auto and truck part manufacture.

Film covered plastic parts are normally formed via a process in which the paint film laminate is insert molded with the desired thermoplastic in such manner to fuse the film over the injection molded part. The resulting injection molded part is ready for assembly without subsequent painting.

The paint film laminate used in these insert molding techniques may comprise a backing sheet of about 0.020" in thickness to which paint layers are adhered to form a colored side of the laminate. Typically, the backing sheet comprises an extruded thermoplastic sheet.

In such paint film laminates, a paint film, comprising a cast dried continuous paint coating is provided over the backing sheet. The paint film may consist of a monocoat, a clear coat over a base coat or a clear coat and a base coat with interposed print or design. The paint film, including base coat, clear coat and print or design, if desired, commonly ranges from about 0.5–4 mil. in thickness.

The laminated paint films are typically provided in a roll, unwound, then trimmed to a proper "preform" size and shape, ready for insertion into the injection mold. The preform is usually placed along the cavity side of the mold with the painted side thereof facing the mold cavity surface. In some instances, the preform may be placed along the core side of the mold. The mold is then clamped and the desired molten resin is injected into the mold cavity. Heat and pressure conditions in the mold partially melt the backing sheet and a melt bonding or fusion of the injected resin and film occur. Injection molds used for these processes are rear or edge gated so that the molten resin is directed along the backside of the film.

After the part has been cooled in the mold, and one of the mold cavity support surfaces is displaced from the other, the part is then ejected by the use of pneumatically or hydraulically actuated lifters and the like. The lifter cooperates with one side of the mold (usually that side contiguous with the plastic substrate) and ejects or "pops" the finished part out of the mold so that the molding production cycle can continue with the insertion of paint film laminate and plastic into the mold cavity. In many instances, the aesthetic appearance of the paint film laminate covered side of the part, normally used as the "show" side of the part, exhibits a surface blemish in the region in which the flowing plastic first impinges upon the lifter surface.

When elongated paint film covered parts are produced, such as in the case of rocker panels, chin spoilers, bumpers, etc., the blemish can take the form of an unsightly surface line or bump on the show side of paint film laminate covered side on the part, extending transversely to the longitudinal axis of the elongated part, causing a difference in gloss or light reflectance between neighboring sides of the paint film surface adjacent the bump.

SUMMARY OF THE INVENTION

The present invention is accordingly directed to methods and lifter apparatus for ejecting plastic parts and specifically paint film laminate covered plastic parts from a mold cavity that inhibit the formation of surface blemishes during the ejection step of the part in the molding sequence.

In conventional injection molding apparatuses and methods, the lifter comprises a plate like structure having a leading edge that is perpendicularly oriented relative to the longitudinal axis of the elongated part. After the part has been formed in the mold, one half of the mold is normally retracted and the lifter plate associated with the other mold section is actuated via hydraulic or pneumatic pistons to strike the part and eject it from the mold cavity.

The present invention pertains to methods of molding an automobile or truck plastic part wherein a mold cavity is formed by at least two mold portions. A charge of plastic is injected into the mold cavity along a upstream to downstream direction by a runner that is provided in one of the mold portions. After the part is molded in the mold cavity, one of the mold cavity portions is separated from the other to thereby open the mold cavity . The part is ejected from the mold cavity by contacting it with the lifter member having an angled edge portion located along an upstream boundary of the lifter and a trailing edge portion located downstream from the leading edge.

The method is particularly advantageous in the formation of plastic parts of the type wherein a paint film laminate is superposed over at least a portion of the substrate plastic and forms a film laminate covered show face of the part leaving a rear face comprising the exposed plastic surface. In such cases, the lifter strikes the rear face of the formed part.

It has been found that perceptible blemish formation on such paint film laminate covered plastic parts is minimized by providing a leading edge of the lifter that is disposed at an oblique angle relative to the longitudinal axis of the part. Preferably, this oblique angle is from about 30 to 60 ° and in the presently preferred embodiment, is about 45°.

In accordance with conventional co-molding of paint film laminate covered parts, the desired paint film laminate is provided along one surface of the mold cavity with the injected plastic entering the rear of the cavity and fusing with the paint film laminate. The parts formed are of generally elongated nature and have a longitudinal axis extending therethrough. During the molding operation, the charge of plastic material is injected into the mold cavity usually along the longitudinal axis of the part (and the mold) from an upstream to a downstream direction along the back of the paint film laminate.

After the mold portions have been separated. the rear side of the part (opposite from the paint film laminate show side)

is struck by the lifter plate in accordance with the invention. The provision of the obliquely angled upstream or leading edge of the lifter has been shown to minimize perceptible blemish formation in the finished part. Although applicant is not to be bound to any particular theory of operation, it is thought that the shear forces that act along the flowing plastic material are substantially decreased by provision of this angled leading edge of the lifter compared to the prior art. In contradistinction. in prior art devices where the leading edge of the injector is oriented perpendicularly with regard to the longitudinal axis of the part, excessive shear of the plastic leads to a turbulent flow in the region proximate the leading edge of the lifter with the plastic thereby forming a perceptible bump in the paint film show face of the part. Either side of the bump reflects light differently, causing an undesirable gloss difference along the length of the part resulting in characterization of the part as a reject.

The apparatus in accordance with the invention thereby comprises a first mold part and a second mold part which, when in contiguous relation one to another, define a mold cavity there between. One of the mold parts is separated from the other via pistons or other linear movement actuators such as a ball screw or equivalent to open the mold cavity. The lifter in accordance with the invention is associated with one of the mold parts and is adapted to contact the plastic part after the first and second mold parts have been separated to eject the part from the mold cavity.

Other objects and advantages of the invention will be apparent from the following description, the accompanying drawings and the appended claims.

DETAILED DESCRIPTION OF THE PREFERRED EMBODIMENT

Figure 4:
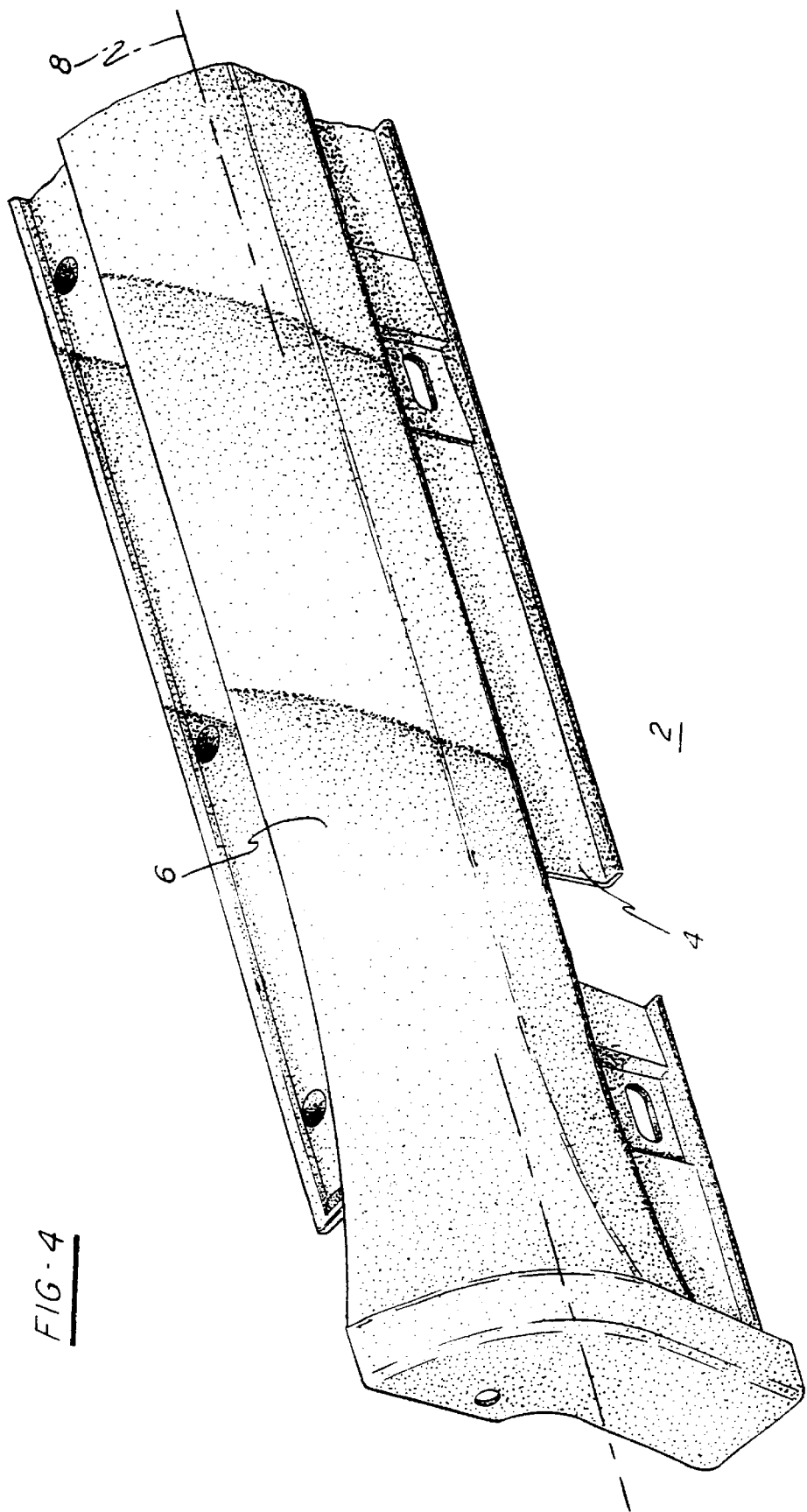
FIG. 4 is a partially cut-a-way perspective view of an elongated paint film laminate covered plastic part made by the method and the apparatus disclosed herein.

Turning now to FIG. 4 of the drawings, there is shown a paint film laminate covered part such as rocker panel 2 that is made in accordance with the invention. As shown, the part 2 comprises a paint film laminate 6, superposed over plastic substrate 4. The rocker panel 2 is an elongated part that is provided with a longitudinal axis 8 extending therethrough. The portion of the part covered by the paint film laminate is sometimes referred to as the "show" face.

Typically, the plastic, for the plastic substrate, is chosen from a host of various thermoplastic and thermoset plastic materials with more common plastic substrates comprising polyvinyl chloride, polyolefins, such as polypropylene, polyacrylates such as poly(methyl)methacrylate, polyvinyl acetate, polyamides, polyimides, polyesters, phenol-formaldehyde polymers, amino polymers, polyurethanes, etc.

The parts are made in accordance with conventional injection co-molding techniques wherein the paint film laminate is placed in the mold cavity with the charge of plastic material injected into the mold along the backside of the paint film laminate.

Figure 1:
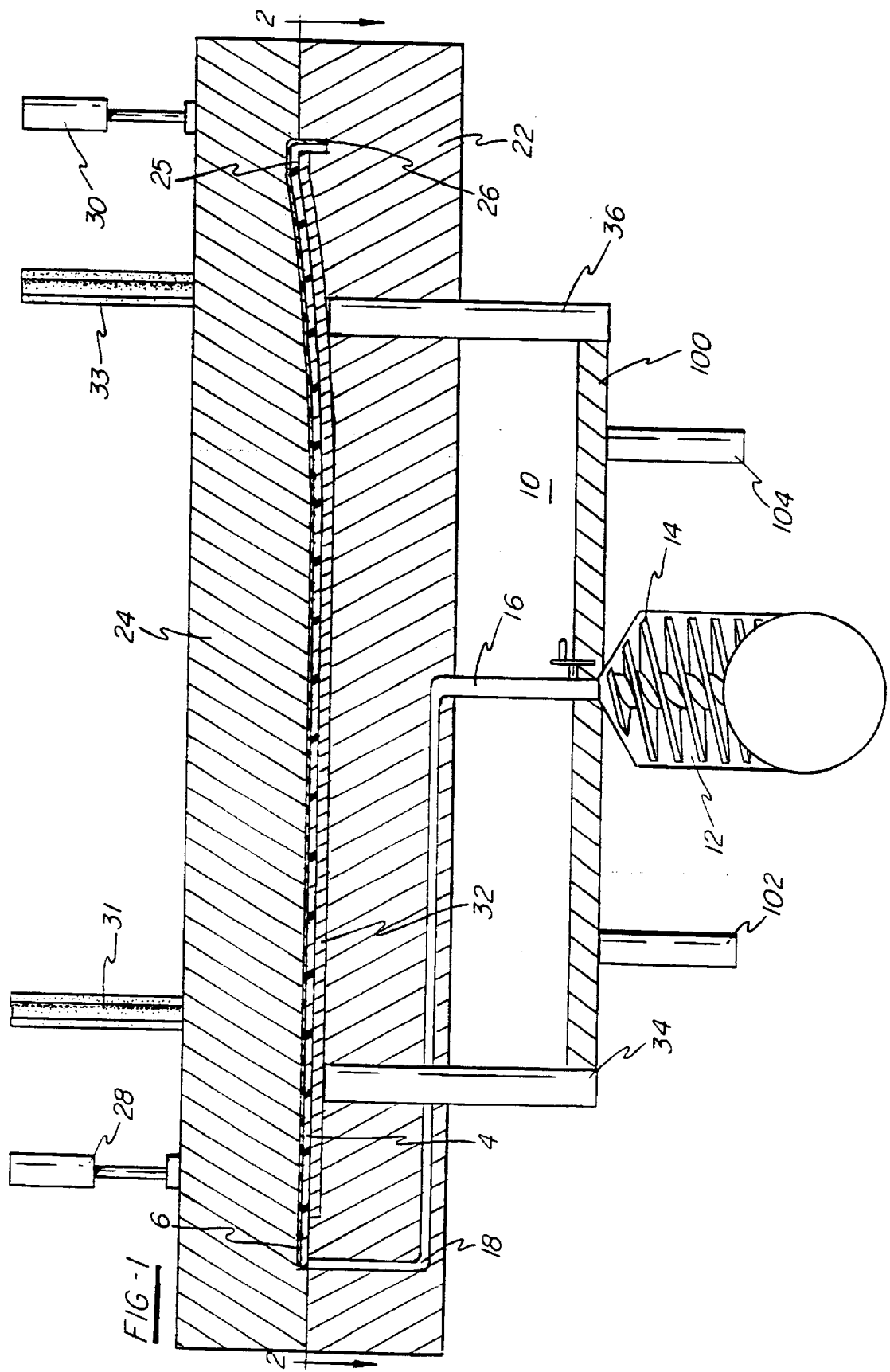
FIG. 1 is a top schematic sectional view of an injection molding machine in which a paint film laminate covered pan may be made in accordance with the invention.

With regard to FIG. 1, there is shown a typical injection molding machine 10 with which the present. invention can be utilized. Here, the molding machine comprises a feed hopper 12 for pressurized injection of plastic material to be plasticized therein. The ejection molding machine comprises a molding cavity 25 that is formed between first mold portion 22 and second mold portion 24, shown in abutting relation to form the desired mold cavity.

Plastic is fed into the feed hopper 12 and is injected into the mold cavity under pressure via feed screw 14 or the like and cooperating sprue 16 that communicates with runner 18 to deliver the pressurized charge of molten plastic to the cavity 25. As shown, the injection of plastic material proceeds from the runner 18 to the downside end 26 of the cavity.

Pistons 28, 30 are operatively associated with the second mold portion 24 so that this mold portion may be reciprocated along rails 31,33 between a mold formation station and a station in which the mold cavity is retracted toward the top with regard to FIG. 1 into an open mold form. The artisan will appreciate the fact that many different arrangements can be used to displace one of the mold parts from the other. One example is shown in U.S. Pat. No. 5,122,051, incorporated by reference herein. The first mold portion 22 is stationary with a portion of the wall of the mold being formed via lifter 32 which is mounted for reciprocation by arms 34, 36 that are carried by ejector plate 100. As shown, the ejector plate 100 is reciprocated by means of piston 102, 104.

Upon operation, the required paint film laminate is first inserted into the mold along the portion of the cavity 25 defined by the contoured configuration of the second mold portion 24. Then, a sufficient shot of plastic material is injected into the molding machine in an upstream to downstream direction from the sprue and runner 16, 18, towards the downstream end of the cavity. As is conventional in the art, the injection of the plastic shot into the cavity may be assisted via pressurized gas flow and the like, and a predetermined amount of the desired plastic material, at desired pressure and temperature is fed into the mold cavity. After the molded part 2 is made in the mold cavity, the second mold portion 24 is retracted via the pistons 28, 30 to the open position. Then, pistons, 102, 104 are actuated to move ejector plate 100 and the lifter 32 carried thereby toward the top as shown in FIG. 1, to "knock" or eject the part 2 out of the mold cavity.

As previously mentioned, in some of the prior art devices, the leading edge of the lifter (the edge first impinging upon the plastic flowing from the upstream to downstream direction) provides a square surface that is pressed upon the plastic substrate during the injection cycle. This can cause an unsightly blemish line in the part manifesting itself especially along the side of the part covered by the paint film laminate 6. This blemish line usually extends perpendicularly to the longitudinal axis 8 of the part 2 and presents a distinct change in gloss characteristics as can be seen from one side of the blemish line to the other.

Figure 2:
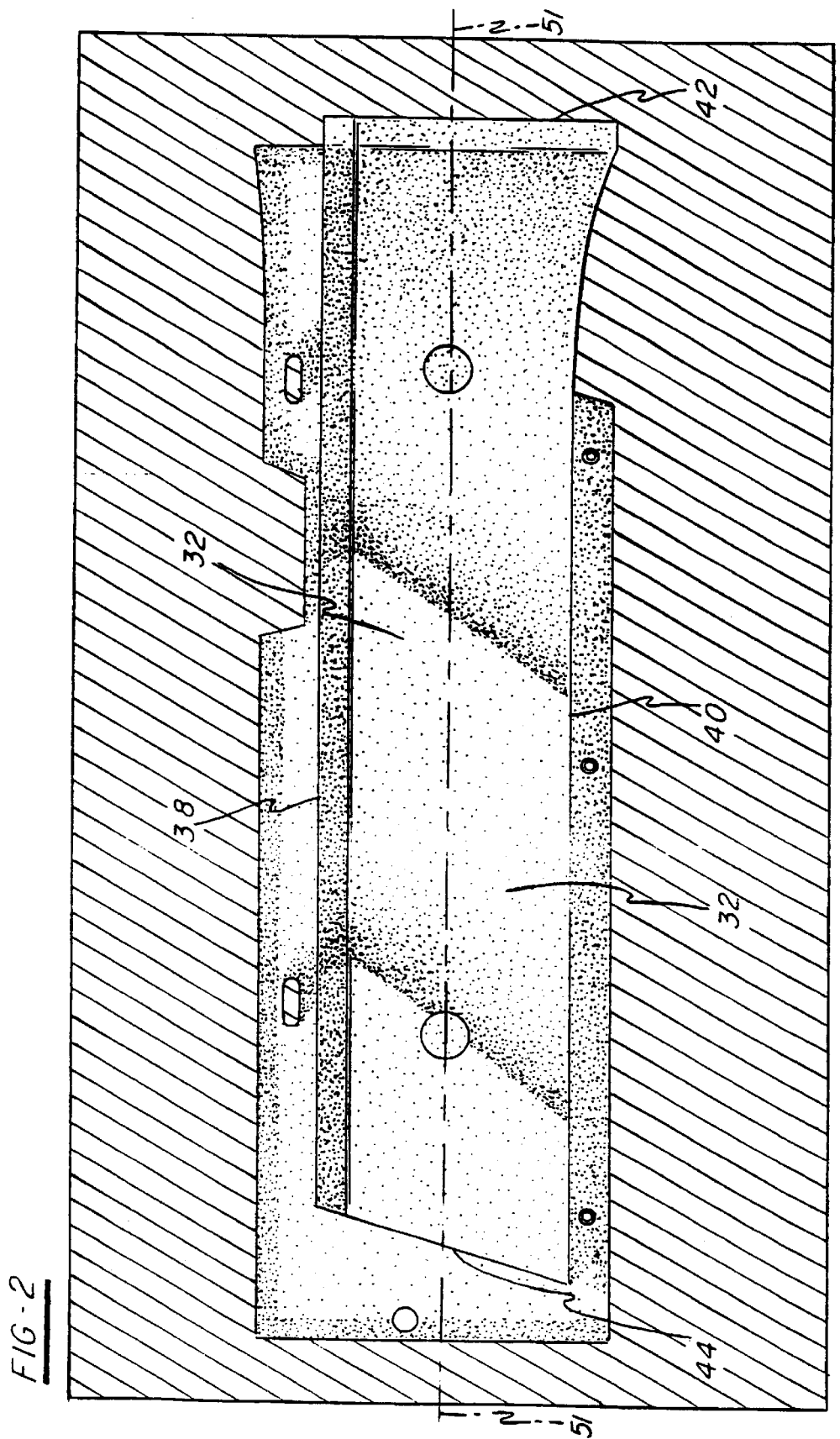
FIG. 2 is a schematic sectional view taken of the injection molding machine of FIG. 1, taken along the plane represented by the lines and arrows 2—2 of FIG. 1, showing a lifter structure in accordance with the invention.

In accordance with the invention, after the requisite part has been made, it is ejected from the mold cavity by the provision of a lifter structure as more clearly shown in FIG. 2. The lifter 32, in accordance with the invention, comprises a top edge 38 and bottom edge 40. A trailing edge 42 (or downstream edge) is provided and the leading edge 44 is positioned at an oblique angle relative to the bottom edge 40 of the lifter or stated differently, relative to the longitudinal axis 51 of the mold. Provision of this angled leading edge 44 has, in preliminary studies, been shown to minimize the formation of a surface line or blemish that otherwise would form generally perpendicularly with regard to the longitudinal axis 8 of the part or of the mold. At present, it is preferred that the leading edge 44 provide an angle of about 30 to 60 degrees relative to the bottom edge 40 of the lifter. The preferred embodiment comprises an angled leading edge of about 45°.

Figure 3:
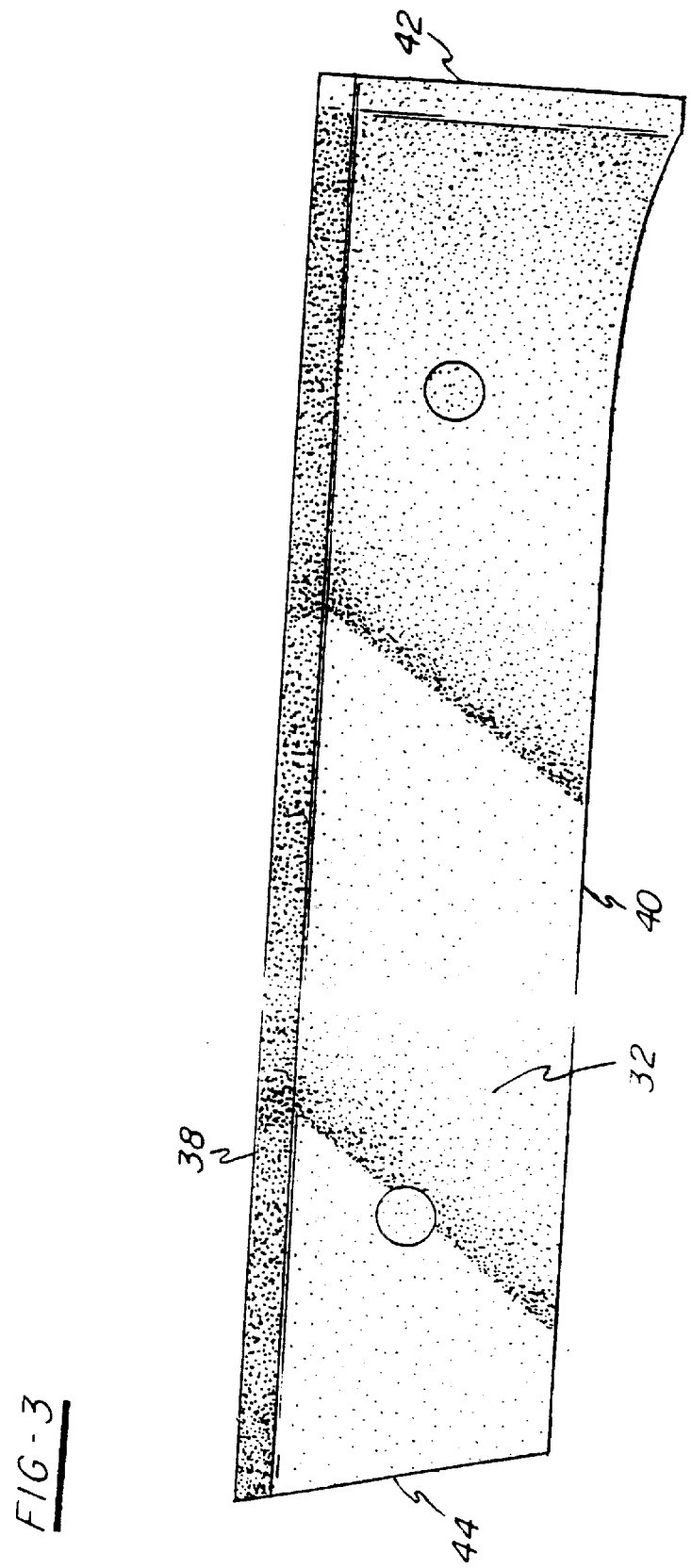
FIG. 3 is a view, similar to that shown in FIG. 2, of another embodiment of a lifter in accordance with the invention.

FIG. 3 shows another lifter embodiment in accordance with the invention. Here, the leading edge provides an edge such that the top edge 38 of the ejector plate is longer than the bottom edge 40. The opposite configuration is shown in FIG. 2.

Figure 5:
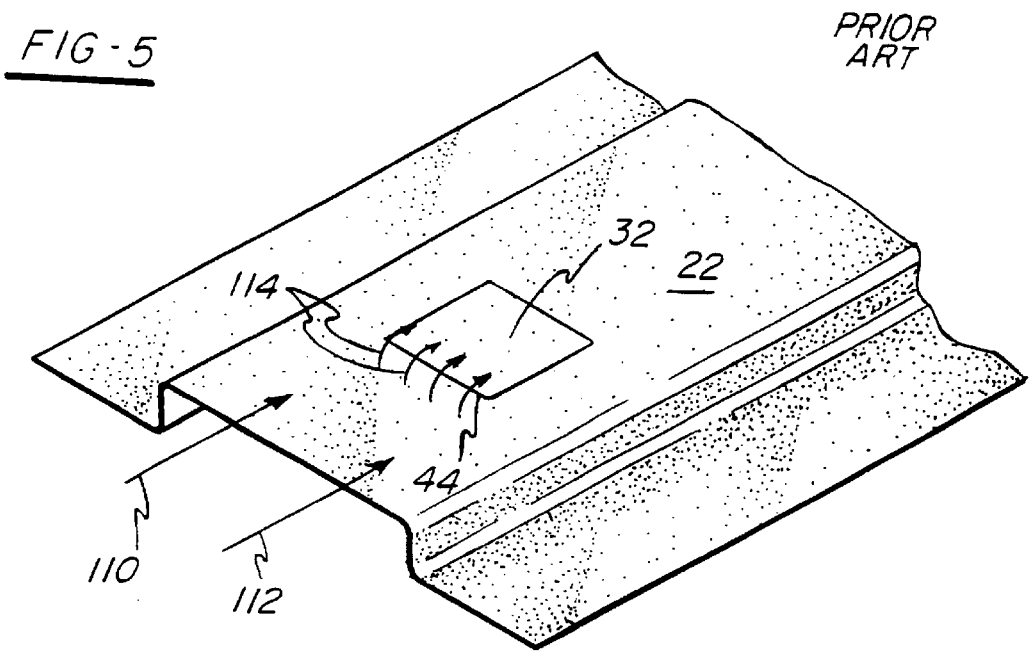
FIG. 5 is a schematic view in perspective of a prior art lifter structure showing plastic flow thereover.

A typical prior art lifter structure is shown in FIG. 5 in simplified schematic form. Here, the surface 22 of the mold and the surface of the lifter are substantially conterminous, presenting a smooth unimpeded surface over which the plastic is to flow as it is injected into the mold. In practice, the leading edge 44 of the lifter may be slightly raised or lowered from the surface 22. Plastic flow is shown by the vector arrows 110, 112 as it is injected from an upstream to downstream direction.

As previously mentioned, when the flow impinges upon the leading edge 44 of the lifter as shown in the FIG. 5 prior art device, an undesirable turbulent plastic flow is fored in the region 114. This is especially true in those situations in which the surface of the lifter 32 is raised from or lower than surrounding mold surfaces.

Figure 6:
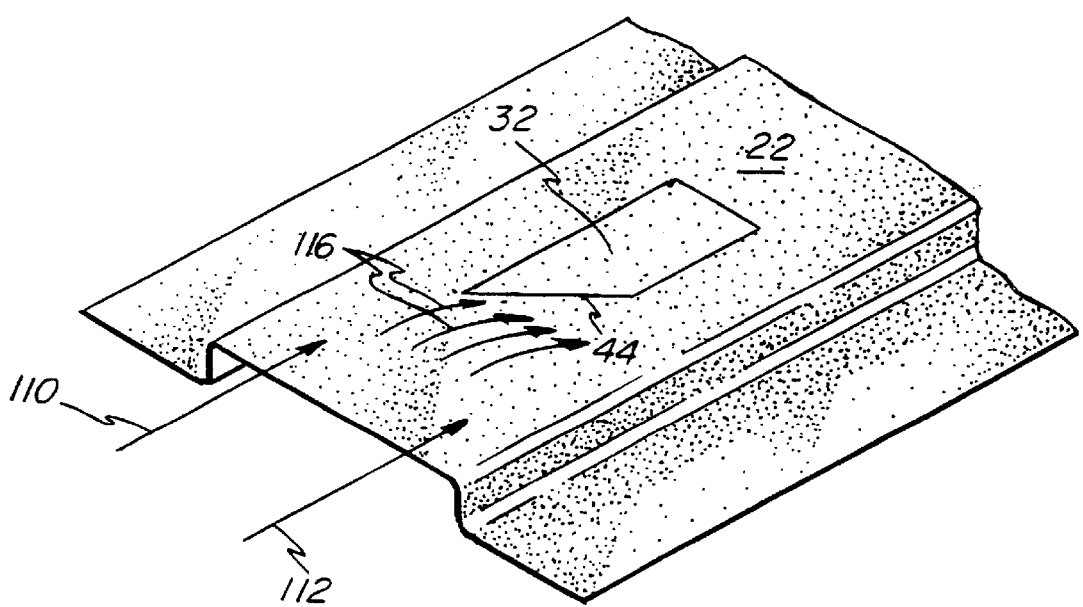
FIG. 6 is a schematic view in perspective of another lifter structure in accordance with the invention shown in conjunction with a less turbulent or laminar flow pattern.

In contrast, and with reference to FIG. 6, the obliquely angled leading edge 44 of the lifter in accordance with the invention promotes the formation of a laminar flow region 116 in the vicinity of the interface of that edge and its neighboring surface of the mold. This structural relationship has been shown to provide aesthetic benefit in the finished plastic parts as previously explained.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A method of molding an automobile or truck plastic part, comprising:
   (a) providing a mold cavity formed by at least two mold portions;
   (b) providing a charge of said plastic into said cavity flowing from an upstream to downstream direction represented by a vector path;
   (c) molding said part;
   (d) separating said mold portions; and
   (e) ejecting said part from said mold cavity by contacting it with a lifter plate having an edge portion located at an upstream boundary of said lifter plate that forms an oblique angle relative to said vector path.

2. Method as recited in claim 1 wherein said plastic part comprises a film covered part and wherein said film is superposed over at least a portion of said plastic and forms a film covered face of the part leaving a rear face having an exposed plastic surface and wherein said ejecting (e) comprises contacting said rear face with said lifter plate.

3. Method of inhibiting perceptible blemish formation on a plastic part having a face surface covered by a film and an exposed plastic rear face, said method comprising insert molding said plastic part in a mold cavity and ejecting said part from said mold cavity by contacting said part with a lifter member having a leading edge and a trailing edge, directing a charge of plastic into said mold cavity to flow in an upstream to downstream direction represented by a vector path, wherein said leading edge is disposed at an oblique angle relative to said vector path.

4. Method as recited in claim 3 wherein said oblique angle is from about 30 to 60°.

5. Method as recited in claim 4 wherein said angle is about 45°.

6. Method of insert molding a plastic part having a face surface covered by a paint film and an exposed plastic rear surface, said method comprising:
   (a) providing a mold cavity formed by at least two mold portions;
   (b) placing said paint film laminate in said mold cavity;
   (c) injecting a charge of said plastic from an upstream to a downstream direction and along a surface of said paint film;
   (d) molding said plastic part in said mold cavity to form said part having said face surface and said rear surface;
   (e) separating said mold portions; and contacting said part with a lifter having an upstream edge and a downstream edge, said lifter also having a longitudinal axis passing therethrough, said upstream edge inclined at an oblique angle relative to said longitudinal axis.

7. Apparatus for molding an automobile or truck plastic part comprising:
   a first mold part and a second mold part, said first mold part and said second mold part when positioned adjacent each other defining a mold cavity therebetween;
   means for separating said first mold part from said second mold part for opening said mold cavity;
   a plastic injection runner communicating with said mold cavity and adapted to inject a shot of molten plastic into and along said cavity from an upstream to downstream direction—represented by a vector path;
   a moveable lifter operatively associated with said mold cavity and adapted to strike said plastic part after said first and second mold parts have been separated and eject said part from said mold cavity, said lifter comprising a leading edge disposed in said upstream direction and a trailing edge disposed downstream from said leading edge, said leading edge forming an oblique angle relative to said vector path.

8. Apparatus as recited in claim 7 wherein said leading edge of said lifter is angled at about 30 to 60° relative to said vector path.

9. Apparatus as recited in claim 8 wherein said leading edge of said lifter is angled at about 45° relative to said vector path.

10. Method of inhibiting perceptible blemish formation on a plastic part having a face surface covered by a paint film and an exposed plastic rear face, said method comprising insert molding said plastic part in a mold cavity and ejecting said part from said mold cavity by contacting said part with a lifter member having a leading edge and a trailing edge wherein said leading edge is disposed at an oblique angle relative to a longitudinal axis extending through said lifter member wherein said oblique angle is from about 30° to about 60°.

11. Method as recited in claim 10 wherein said angle is about 45°.

12. Apparatus for molding an automobile or truck plastic part having a longitudinal axis extending therethrough comprising:

a first mold part and a second mold part, said first mold part and said second mold part when positioned adjacent each other defining a mold cavity therebetween;

means for separating said first mold part from said second mold part for opening said mold cavity;

a plastic injection runner communicating with said mold cavity and adapted to inject a shot of molten plastic into and along said cavity from an upstream to downstream direction;

a moveable lifter operatively associated with said mold cavity and adapted to strike said plastic part after said first and second mold parts have been separated and eject said part from said mold cavity, said lifter comprising a leading edge disposed in said upstream direction and a trailing edge disposed downstream from said leading edge, said leading edge forming an oblique angle relative to said longitudinal axis, wherein said leading edge of said lifter is angled at about 30° to 60° relative to said longitudinal axis.

13. Apparatus as recited in claim 12 wherein said leading edge of said lifter is angled at about 45° relative to said longitudinal axis.

* * * * *